United States Patent [19]
Kunert

[11] Patent Number: 5,240,279
[45] Date of Patent: Aug. 31, 1993

[54] AUXILIARY FRAME FOR A WHEEL SUSPENSION SYSTEM OF A MOTOR VEHICLE

[75] Inventor: Reinhard Kunert, Weissach-Flacht, Fed. Rep. of Germany

[73] Assignee: Dr. Ing. h.c.F. Porsche AG, Fed. Rep. of Germany

[21] Appl. No.: 930,625

[22] Filed: Aug. 17, 1992

[30] Foreign Application Priority Data

Aug. 16, 1991 [DE] Fed. Rep. of Germany ....... 4127037

[51] Int. Cl.⁵ .............................................. B60G 25/00
[52] U.S. Cl. .................................. 280/673; 280/661; 280/689; 280/785
[58] Field of Search ............... 280/673, 661, 688, 690, 280/785

[56] References Cited

U.S. PATENT DOCUMENTS 4,714,132 12/1987 Hattori et al. ................ 180/312
5,026,090 6/1991 Sekino ........................... 280/673

FOREIGN PATENT DOCUMENTS 0036845 9/1981 European Pat. Off. .
0301219 2/1989 European Pat. Off. .
0306046 3/1989 European Pat. Off. .
2440494 3/1975 Fed. Rep. of Germany .
1951271 8/1977 Fed. Rep. of Germany .
2536060 5/1987 Fed. Rep. of Germany .
2614000 10/1988 France ............................ 280/785
63-263113 10/1988 Japan .............................. 280/661
2-34413 2/1990 Japan ............................... 280/661

Primary Examiner—Eric D. Culbreth
Attorney, Agent, or Firm—Evenson, McKeown, Edwards & Lenahan

[57] ABSTRACT

An auxiliary frame for a wheel suspension system of a motor vehicle is fastened to the vehicle body and has bearing receiving devices for links of the wheel suspension. The auxiliary frame is constructed in two parts and has a first cross member which is connected with a second cross member by way of fastening bolts which, at the same time, are used for the fastening of link bearings on the auxiliary frame. This design results in the constructional expenditures of the connections to the link bearings being substantially reduced.

12 Claims, 3 Drawing Sheets

AUXILIARY FRAME FOR A WHEEL SUSPENSION SYSTEM OF A MOTOR VEHICLE

BACKGROUND AND SUMMARY OF THE INVENTION

The present invention relates to an auxiliary frame for a wheel suspension system of a motor vehicle, and more particularly to an auxiliary frame which is fastened to the vehicle body and comprises bearing receiving devices for wheel suspension links.

German Patent Document DE-OS 24 40 494 discloses a supporting frame for a wheel suspension system of a vehicle which is fastened to the vehicle body and comprises bearing receiving devices for wheel suspension links. This supporting frame consists of a support which is aligned transversely in the vehicle and in each case, at the end face, receives two link bearings for a semi-trailing arm axle. Another construction of an auxiliary frame for a wheel suspension system, as shown in German Patent Document DE-A 25 36 060, consists of a one-piece U-shaped support which is fastened to the vehicle body. The connection of the link bearing to the vehicle body takes place by way of an identical fastening screw of the auxiliary frame.

It is an object of the present invention to provide a lightweight auxiliary frame for a wheel suspension system which has a simple construction with reduced constructive expenditures.

This object has been achieved in accordance with the present invention by constructing the auxiliary frame in two parts consisting of a first cross member which is connected with a second cross member by way of fastening bolts which are also used for fastening link bearings on the auxiliary frame.

The principal advantages achieved with the present invention are that the expenditures of the connections to the link bearings and the auxiliary frame divided in two parts are reduced because additional connections of the two parts of the auxiliary frame are not required. Thus, a fastening of a first cross member to a second cross member of the frame is advantageously utilized for receiving a link bearing for a wheel suspension link, whereby additional heavyweight bearing receiving devices on the auxiliary frame are rendered unnecessary.

For the receiving of one link bearing, a gap is used between the two cross-members to be connected in order to support the bearing on its two front faces by way of parallel supporting surfaces. The gap is preferably formed between an arm of one cross member, which projects away from the leg, and a projection of another cross member, in which case the arm, at a distance from the bearing, is at the same time connected with the other cross member by way of a fastening screw. Another link bearing of a wheel suspension link is connected with this screw and is arranged on the outside of one cross member, whereby the expenditure of additional fastening screws in addition to a holding screw for the bearing is advantageously avoided.

By way of two fastening screws, a stabilizer bearing bracket is connected with one cross member, in which case one fastening screw receives a third link bearing which is arranged between the cross member and a leg of the bearing bracket. This bolt, which holds the link bearing, comprises an eccentric adjusting element by way of which the caster of the wheel is adjusted.

BRIEF DESCRIPTION OF THE DRAWINGS

These and further objects, features and advantages of the present invention will become more readily apparent from the following detailed description of a currently preferred embodiment when taken in conjunction with the accompanying drawings wherein.

DETAILED DESCRIPTION OF THE DRAWINGS

Figure 1:
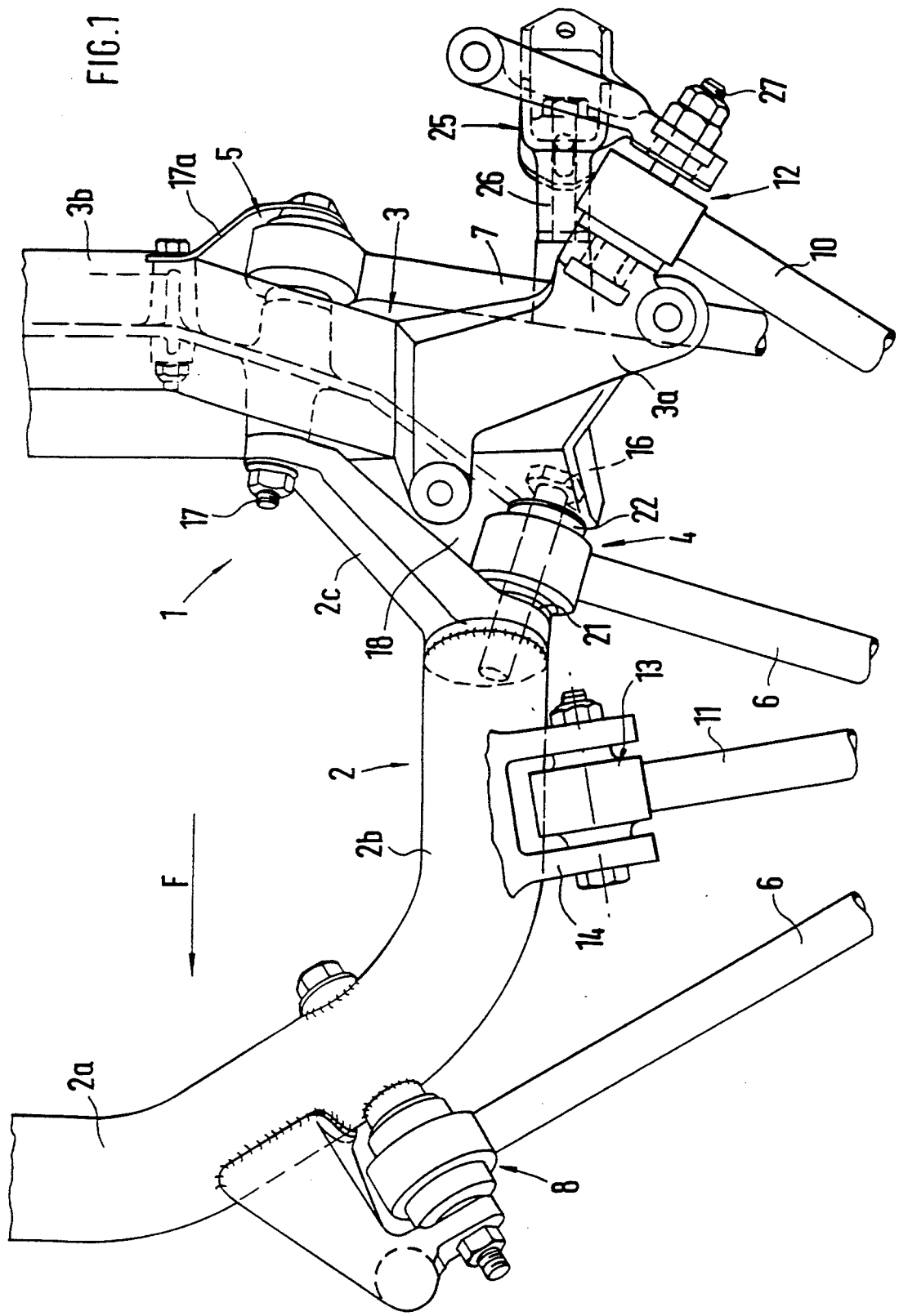
FIG. 1 is a top view of an auxiliary frame with link bearings.

The auxiliary frame designated generally by numeral 1 for a wheel suspension system, particularly for a rear wheel suspension in a multi link construction, comprises, as viewed in terms of the driving direction F, a first forward cross member 2 which is connected with a second rearward cross member 3 to form a strength unit and is fastened to the vehicle body through several bearings. Bearings 4, 8 are held for a lower transverse link 6 as well as a bearing 5 for a tie rod 7.

The upper fastening of the wheel suspension system is formed by two links 10, 11 with the bearings 12, 13. Bearing 12 is provided on the auxiliary frame 1, and bearing 13 is provided on the vehicle body 14.

Figure 2:
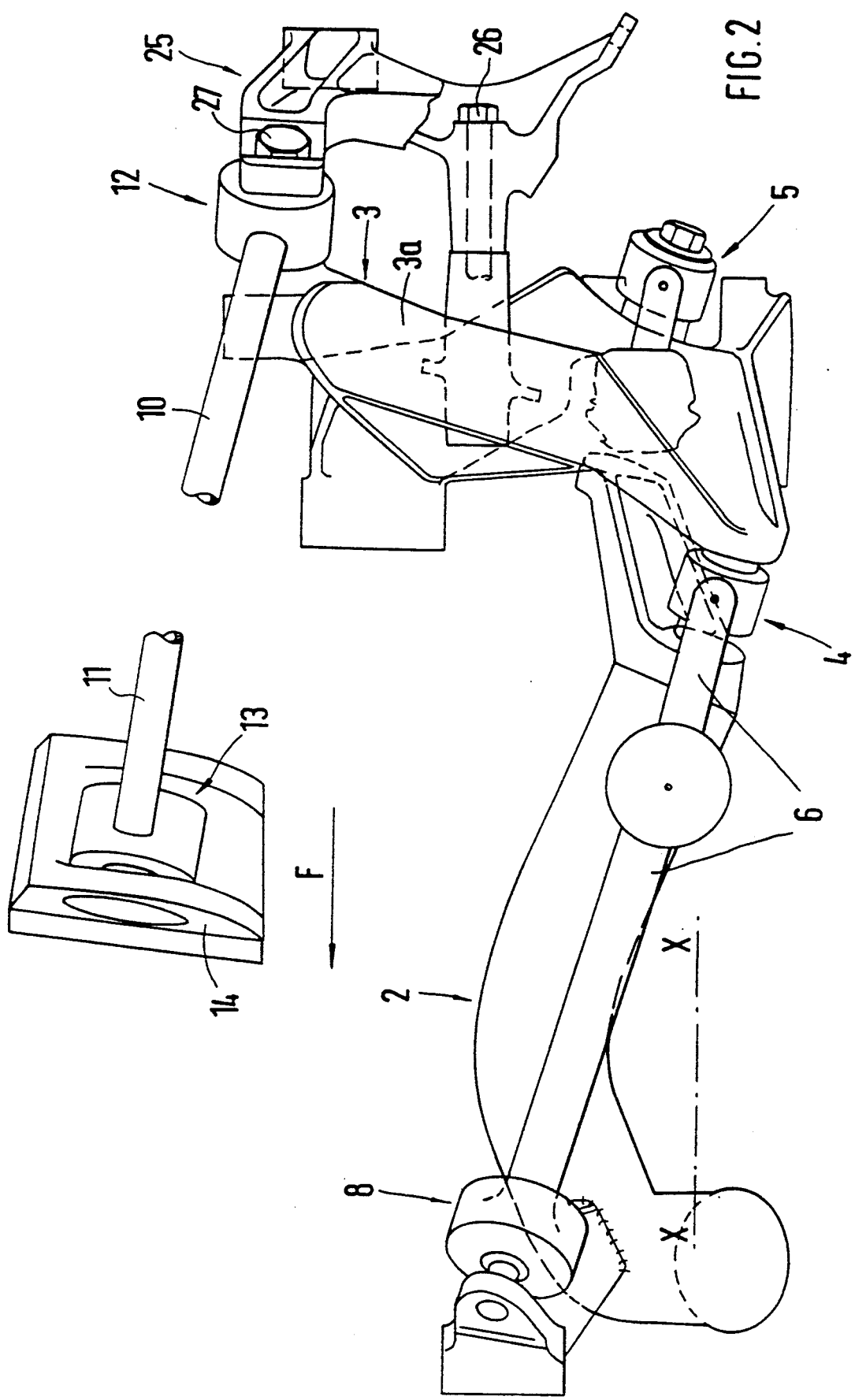
FIG. 2 is a side view of the auxiliary frame shown in FIG. 1.

The forward cross member 2 is U-shaped, with legs 2b projecting away from a transversely extending supporting part 2a and extending approximately in a horizontal plane X—X (FIG. 2). The rearward cross member 3 has end-face pillars 3a which extend from a transversely extending supporting part 3b situated approximately in the same plane X—X as the forward cross member 2, the end face pillars 3a extending perpendicularly upward with respect to the plane X—X.

The two cross members 2, 3 of the auxiliary frame 1 are connected with one another on each side by way of fastening bolts 16, 17 which also serve for fastening of the bearings 4, 5 for the respective links 6, 7. The bearing 4 of link 6 is fitted into a gap 18 formed between arms 2c of the forward cross member 2 projecting away from the leg 2b and the rearward cross member 3, and is held by the bolt 16 which also connects the two cross members 2, 3 with one another.

The gap 18 for the receiving the bearing 4 is bounded by parallel surfaces 21, 22, with corresponding faces of the bearing 4 being situated opposite these surfaces 21, 22. The swivelling axis formed by the bolt 16 extends at an obtuse angle to the leg 2b of the first cross member 2. The cross member 2 is also connected, by the arm 2c bent away from the leg 2b, with the transversely extending supporting part 3b of the cross member 3 by the other bolt 17. At the end face, the bolt 17 carries the bearing 5 for the link 7 which is arranged on the outside of the supporting part 3b. The bolt 17 may be held by a striking plate 17a connected with the supporting part 3b. Thus, the two bolts 16, 17 of each side of the auxiliary frame 1, connect the cross members 2, 3 with one another and, at the same time, fix the bearings 4, 5 to the auxiliary frame 1.

As illustrated in FIG. 1, a stabilizer bearing bracket 25 is connected with the pillar 3a of the cross member 3 by fastening bolts 26, 27. The bolt 27, at the same time, carries the bearing 12 for the upper link 10 so that a separate fastening of the bearing 12 or of the bearing bracket 25 is unnecessary.

Figure 3:
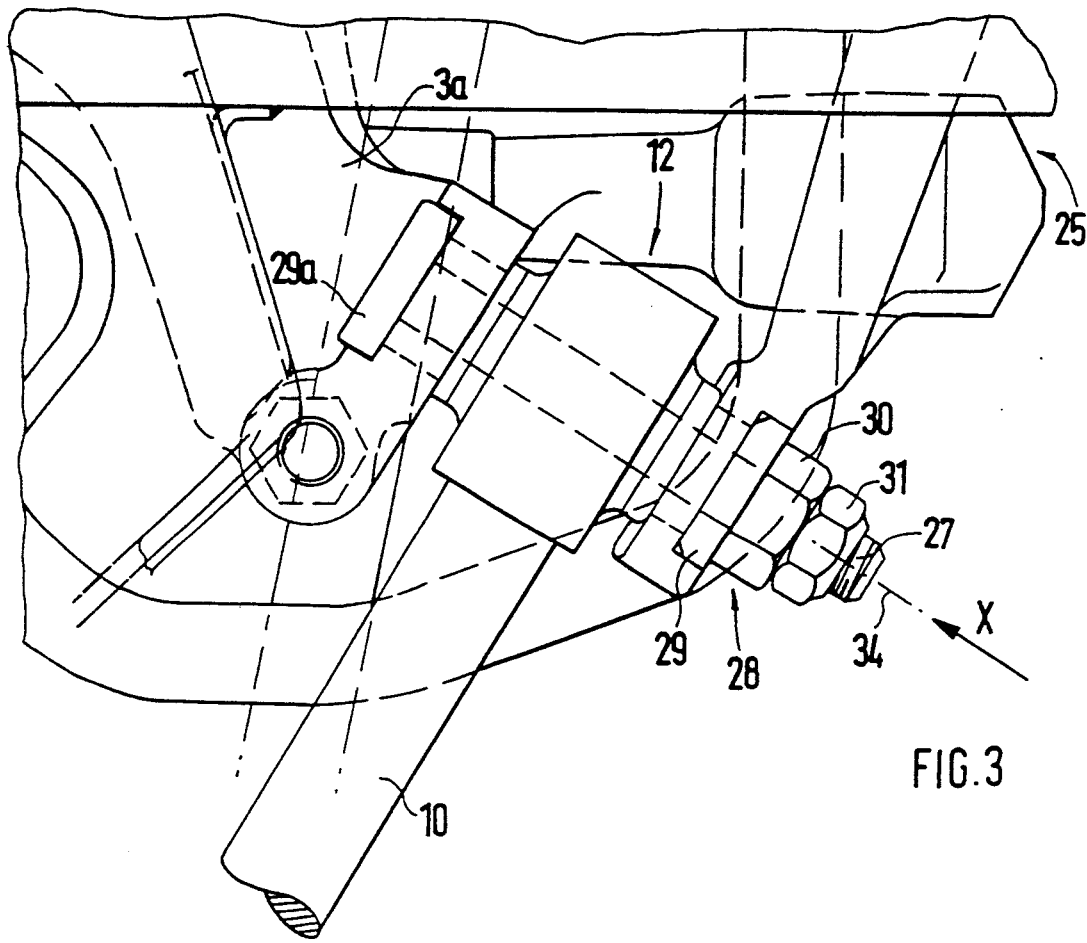
FIG. 3 is a top view of an eccentric adjusting element in accordance with another embodiment of the present invention.
Figure 4:
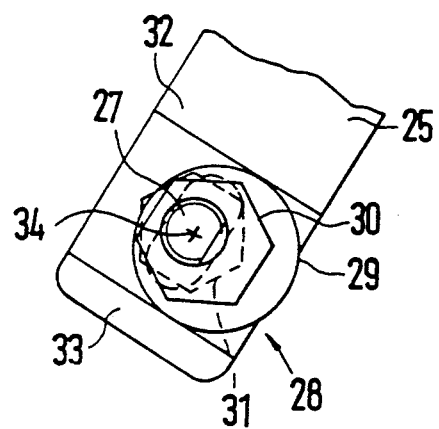
FIG. 4 is a view of the eccentric adjusting element viewed in the direction of arrow X in FIG. 3.

In another embodiment shown in FIGS. 3 and 4, the fastening bolt 27 is provided with an eccentric adjusting element 28. This adjusting element 28 comprises an eccentric disk 29 with a hexagon 30. The eccentric disk 29 is non-rotatably connected with the bolt 27 whose end-face head is formed by a second eccentric disk 29a arranged in a groove with lateral ramps. The hexagon 30 may be offset eccentrically with respect to the bolt axis 34 in order to construct the eccentric disk 29 smaller and therefore lighter. A securing of the bolt connection takes place by a fastening nut 31. For the adjustment of the wheel, the eccentric disk 29 is rotated by the hexagon 30 between boundaries 32 and 33 of the bearing bracket 25 so that the bolt axis 34 experiences a displacement and the wheel is therefore adjusted. This arrangement has the advantage that the adjusting and securing of the screwed connection takes place from the direction of an exterior side, particularly when an access to the end-face head of the screw 27 is not possible.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An auxiliary frame for a motor vehicle wheel suspension fastened to a vehicle body, comprising bearing receiving devices for links of the wheel suspension, the auxiliary frame being constructed as a first cross member and a second cross member, the first cross member being connected with the second cross member by fastening bolts which also fasten link bearings on the auxiliary frame, wherein the first cross member has legs bent away from a supporting part, the legs being connected by a fastening bolt directly with the second cross member and being connected with one another by one of the fastening bolts using one of the link bearings.

2. The auxiliary frame according to claim 1, wherein the one link bearing is arranged in a gap formed by the leg of the first cross member and the second cross member, the gap being bounded by parallel surfaces situated opposite the faces of the one link bearing.

3. The auxiliary frame according to claim 1, wherein the bent-away legs of the first cross member each comprise a bent-away arm connected on a free end thereof, by another of the fastening bolts, with the second cross member, and a parallel surface is formed in the transition area from the leg to the arm.

4. The auxiliary frame according to claim 3, wherein the one link bearing is arranged in a gap formed by the leg of the first cross member and the second cross member, the gap being bounded by parallel surface situated opposite the faces of the one link bearing.

5. The auxiliary frame according to claim 3, wherein via the another fastening bolt between the arm on the leg of the first cross member and the second cross member, another of the link bearing is held on an exterior side of the second cross member.

6. The auxiliary frame according to claim 5, wherein the another fastening bolt is held on the exterior side on the bearing by a striking plate which is connected with a supporting part of the second cross member.

7. An auxiliary frame for a motor vehicle wheel suspension fastened to a vehicle body, comprising bearing receiving devices for links of the wheel suspension, the auxiliary frame being constructed as a first cross member and a second cross member, the first cross member being connected with the second cross member by fastening bolts which also fasten link bearings on the auxiliary frame, wherein the first cross member has legs bent away from a supporting part, and a swivel axis of the one link bearing is at an obtuse angle to the legs of the first cross member, the legs being connected by a fastening bolt directly with the second cross member and being connected with one another by one of the fastening bolts using one of the link bearings.

8. The auxiliary frame according to claim 7, wherein the one link bearing is arranged in a gap formed by the leg of the first cross member and the second cross member, the gap being bounded by parallel surfaces situated opposite the faces of the one link bearing.

9. The auxiliary frame according to claim 8, wherein the bent-away legs of the first cross member each comprise a bent-away arm connected on a free end thereof, by another of the fastening bolts, with the second cross member, and a parallel surface is formed in the transition area from the leg to the arm.

10. An auxiliary frame for a motor vehicle wheel suspension fastened to a vehicle body, comprising bearing receiving devices for links of the wheel suspension, the auxiliary frame being constructed as a first cross member and a second cross member, the first cross member being connected with the second cross member by fastening bolts which also fasten link bearings on the auxiliary frame, wherein on a pillar of the second cross member, an additional link bearing is held between the pillar and a stabilizer bearing bracket by an additional fastening bolt on the cross member, and a further fastening bolt, at an approximately perpendicular distance from the additional fastening bolt, being fastened on the cross members.

11. The auxiliary frame according to claim 10, wherein the additional fastening bolt holding the additional link bearing forms an eccentric adjusting element comprising an eccentric disk with a connected hexagonal nut arranged on the bolt, and the disk is held between boundaries on the stabilizer bearing bracket.

12. The auxiliary frame according to claim 11, wherein the additional fastening bolt has a head with an eccentric disk arranged in a groove with lateral ramps.

* * * * *